FLASHING BARRICADE LIGHT

Filed Feb. 11, 1958

Inventor
Ewing D. Nunn
By Ira Milton Jones
Attorney

3,014,209
FLASHING BARRICADE LIGHT

Ewing D. Nunn, Mequon, Wis., assignor to Northern Signal Company, Inc., Saukville, Wis., a corporation of Wisconsin Filed Feb. 11, 1958, Ser. No. 714,551
4 Claims. (Cl. 340—331)

Figure 1:
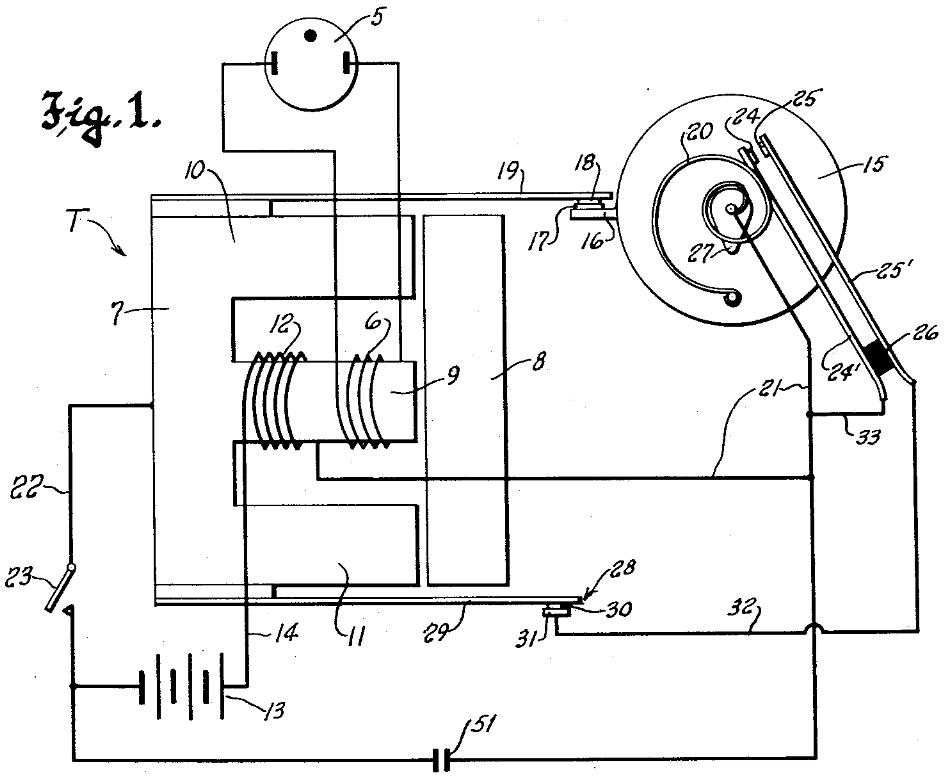

This invention relates to flashing signal lights and, more particularly, to the means for periodically energizing such lights; and although the invention has utility in other fields, it is primarily useful in connection with flashing type barricade lights.

Intermittent flashing devices which are commonly used on street barricades as warning lights must be portable and, therefore, rely upon dry batteries for their operation. Low current consumption is thus an essential attribute of a commercially acceptable barricade light. This requirement has, understandably, led to some use of gaseous discharge tubes as the light source, but heretofore signal lights employing such tubes have had serious disadvantages and therefore they have not supplanted signal lights using incandescent filamentary lamps, despite their greater economy.

In practice, it has been found that the batteries of flashing barricade lights using filamentary lamps must be replaced every thirty days. Whenever the battery is replaced it is also necessary to replace the lamp, because of the relatively rapid deterioration of the filament under such severe on and off service. An incandescent lamp that has been in service for thirty days would last only a few minutes if energized by a fresh battery.

The use of a neon or other suitable gas-filled tube as the light source overcomes this economic disadvantage; but in all flashing barricade lights heretofore available which used gaseous tubes, the duration of the light flashes was too short to be reliably effective.

Heretofore, the gaseous tubes used in warning light signals were caused to flash approximately once each second, and the duration of each flash was nominally two to five milliseconds long. This, it was felt, especially by highway commissions, was not long enough to serve adequately as a salutary warning to high speed drivers. Compared to the flashes of a filamentary type lamp, with its inevitable persistence of glow after cessation of current flow, the "on" time of the gas lamp was undoubtedly very short. As a result, barricade lights that use gaseous discharge tubes have been looked upon with increasing disfavor, to the extent that they could conceivably be legislated out of existence.

The present invention overcomes this objection to the use of gaseous discharge tubes as the light source in flashing barricade lights, and achieves its objective through a simple though highly significant modification of a circuit controller heretofore relatively well-known in the electric fence art. In this controller a transformer has its primary periodically and momentarily connected across a battery by the operation of a momentum wheel kept in operation by the successive momentary energizations of the primary, to produce a succession of voltage peaks in the secondary circuit, the load (which in this case is a neon tube) being connected in the secondary circuit.

In keeping with its primary purpose, the invention has as a specific object to so modify a circuit controller of the said type that in addition to the single momentary closure of the primary circuit at the initiation of each cycle, two spaced apart series or groups of very closely spaced momentary energizations of the primary are produced during each cycle to thereby effect two correspondingly spaced successions of voltage surges in the secondary. Each individual voltage surge produces a separate and distinct flash of the neon tube, but because the surges occur in such close succession, the eye sees each group thereof as one continuous flash.

Another object of this invention is to provide a circuit controller for the purpose set forth, which is distinguished by exceptional simplicity and the absence of complex mechanism, so that the device is not only entirely reliable and satisfactory in operation but inexpensive to manufacture and maintain.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

Figure 2:
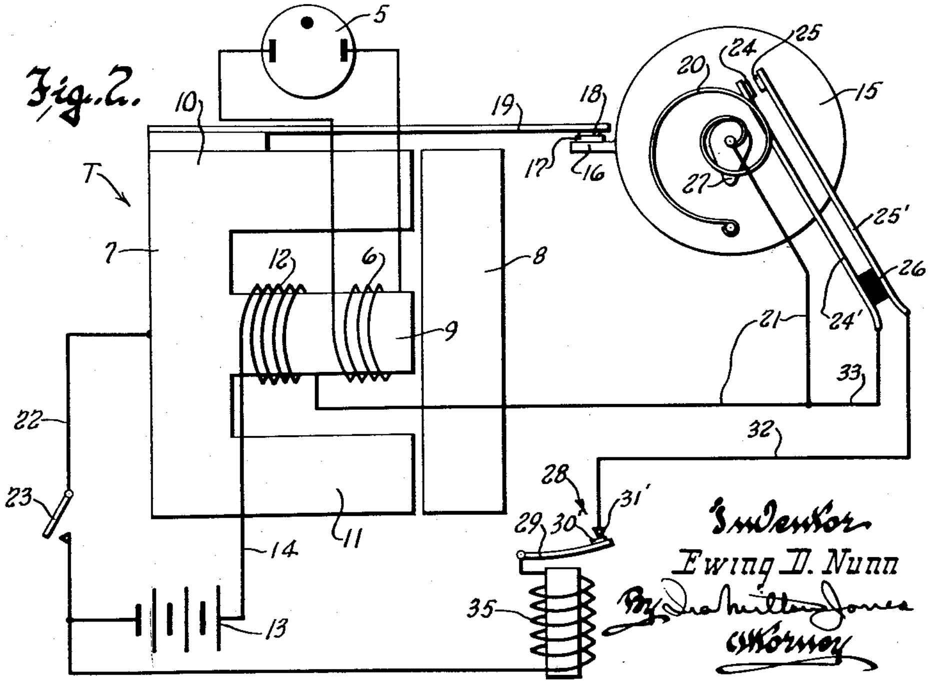

The accompanying drawing illustrates two complete examples of the physical embodiments of the invention constructed according to the best mode so far devised for the practical application of the principles thereof, and in which:

FIGURE 1 is a diagrammatic illustration of the preferred embodiment of the invention; and FIGURE 2 is a diagrammatic illustration of another embodiment thereof.

Referring to the accompanying drawings, the numeral 5 designates a light source which, for the purpose of this invention, is a gaseous discharge tube containing an ionizable gas such as neon. The terminals of this tube are connected across the secondary 6 of a transformer designated generally by the letter T. The core of the transformer comprises two magnetically permeable members 7 and 8 fixed in spaced apart relationship. The member 7 is a main E-shaped section having a medial leg 9 flanked by two side legs 10 and 11, and the other member 8 is a bridging bar which extends across the ends of the legs of the E-shaped member, being spaced from them, however, to define an air gap at the end of each leg. Both the primary winding 12 and the secondary winding 6 of the transformer are mounted on the medial leg 9 so as to be in closely coupled inductive relation. Accordingly, with each energization and deenergization of the primary, a relatively high voltage will be induced in the secondary by which the tube 5 will be energized and lighted.

The voltage source, because of the nature of the device, must be portable and, hence, is best provided by a dry battery 13. One side of the battery is directly connected, as by a conductor 14, with one end of the primary. The other side of the battery is periodically and momentarily connected with the opposite end of the primary as a result of the operation of the device and in a manner now about to be described.

Mounted in juxtaposition to the transformer T is a momentum wheel 15 which is freely rotatably mounted in bearings, not shown. The wheel is intermittently "kicked," to impart rotation to it, by means of a resilient arm 19 so secured to the leg 9 of the transformer core that its free end projects forwardly across the air gap at the end of the leg 9. Carried by the wheel at a distance radially out from its center is an arm 16 against which the free end of the arm 19 engages to "kick" the wheel into rotation. The arms 16 and 19 are provided at their free ends with cooperating contacts 17 and 18, respectively. A torsion spring 20 acting upon the momentum wheel yieldingly holds the contacts 17 and 18 in engagement, and since these contacts are connected in series circuit with the battery and the primary, the primary is energized whenever the contacts 17 and 18 are closed.

The circuit by which the contacts 17 and 18 connect the primary across the battery comprises the body of the momentum wheel and a conductor 21 which leads therefrom to the adjacent end of the primary, the conductor 14 which connects the other end of the primary to one side of the battery, and a conductor 22 which connects the core of the electromagnet, and hence the resilient arm 19, with the other side of the battery upon closure of a main switch 23.

The resilient arm 19 is of magnetic material, or may have a separate magnetic armature (not shown) mounted thereon in line with the air gap, but, in any event, upon energization of the primary, the arm is snapped toward the transformer core member 8 and thereby imparts a kick to the momentum wheel to cause it to rotate in a counterclockwise direction against the tension of the torsion spring 20. The parts involved are so designed and the forces so balanced that the counterclockwise rotation thus imparted to the momentum wheel is less than 360°, and upon completion of this counterclockwise rotation, the spring 20 turns the wheel in the clockwise direction to reclose the contacts 17 and 18 and start the cycle all over again.

With each such described opening of the normally closed contacts 17 and 18, there is of course a sudden and substantial voltage surge in the secondary which lights the tube 5, but the period during which the tube is energized by this voltage surge is extremely brief and far too short to be reliably effective. To overcome this deficiency, the present invention provides means which utilizes some of the structure already described, in combination with others, to produce two successive spaced apart "ignition" or "light on" periods of considerably longer duration than that obtained upon the opening of the contacts 17 and 18, or for that matter, longer than can be obtained by any single opening of the primary circuit.

To this end, a pair of normally open contacts 24, 25 is connected in parallel with the contacts 17 and 18. These contacts 24, 25 are momentarily closed twice during each cycle. They are carried on the free ends of a pair of spring fingers 24' and 25', respectively, which are suitably mounted as by being secured to a stationary block of insulation 26, to dispose the outer free ends of the finger 24' in the path of a cam 27 fixed to the momentum wheel or its axle. Thus, as the momentum wheel advances in its counterclockwise direction, the cam momentarily closes the contacts 24, 25 and they are again reclosed as the momentum wheel returns in the clockwise direction under the force of its spring 20.

Since, as indicated, the pair of normally open contacts 24, 25 is connected in parallel with the contacts 17 and 18, the closure and opening of the contacts 24 and 25 could be utilized to add two additional flashes of light to those already being produced for each cycle of the mechanism, but the duration of these flashes would be no longer than that which results from the opening of the contacts 17 and 18, and the time interval between them would be too long for them to be perceived as a single flash due to persistence of vision.

However, the momentary closure of the contacts 24, 25 twice each cycle does provide means by which a rapid succession of energizations and deenergizations of the primary can be obtained to produce two groups of very closely spaced light flashes, each providing the appearance of a single illumination of substantial duration. This is done by what normally would be considered a vibrator, indicated generally by the numeral 28 and which comprises a resilient arm 29 fixed at one end of the leg 11 of the transformer core and projecting therefrom across the air gap at the end of that leg. On its outer free end portion, the arm 29 carries a contact point 30 which is biased into engagement with a stationary contact 31 by the spring tension in the arm 29. Accordingly, the contacts 30, 31 are normally closed.

Since the spring arm 29 is secured to the core of the transformer, it is grounded and therefore connected to one side of the battery through conductor 22 and switch 23. The contact 31 is connected as by a conductor 32 with the blade 25', and the other blade 24' is connected through a conductor 33 and the conductor 21 to the adjacent end of the primary. Each time the normally open contacts 24, 25 are closed, the primary will be energized, the energizing circuit passing through the then closed contacts 24, 25 and the normally closed contacts 30, 31. However, the instant the primary is energized, the arm 29 will be attracted and the contacts 30, 31 will be opened.

Although the cam 27 holds the contacts 24, 25 closed for only a relatively short time, the resilience of the arm 29 is such that it will move toward and from the core member 8 at least eight or ten times in rapid succession during each closure of contacts 24, 25 and of course with each such response of the arm 29 and the consequent brief interruption of the primary circuit there is a corresponding voltage impulse in the secondary sufficient to light the tube 5.

Since, as indicated hereinbefore, the cam 27 closes the contacts 24, 25 twice during each cycle, this succession of very closely spaced energizations of the lamp 5 also occurs twice each cycle, and s ince the interval between the successive individual energizations is so very short due to the vibrating action of arm 29, normal image persistence links the individual light flashes of each group and makes them appear as one relatively long flash. For each cycle, therefore, the device produces one very short sharp flash, as the contacts 17–18 separate and the cycle begins, and two spaced apart long-appearing flashes, one during the advance of the momentum wheel and the other during its return.

Preferably a condenser 51 is connected across the sets of contacts 24, 25 and 30, 31 to minimize arcing.

Although the invention is best embodied in the structure shown in FIGURE 1, it can also be practiced with a controller like that illustrated in FIGURE 2. The chief difference between the two devices is in the specific construction of the "vibrator" by which the two trains or groups of secondary voltage surges are produced. Thus, instead of using the transformer as the electro-magnet by which the movable contact 30 is vibrated, a separate vibrator coil 35 is provided. This coil is connected, in series with its set of normally closed contacts 30'—31', between the finger 25' and the battery terminal which is grounded to the transformer core. In other respects the device of FIGURE 2 is like that shown in FIGURE 1.

From the foregoing description taken in connection with the accompanying drawing, it will be readily apparent to those skilled in the art that this invention makes it entirely feasible to use the more economical gaseous discharge tube as the light source of flashing barricade warning lights, since it overcomes the objection thereto which heretofore made it less desirable than the filamentary type lamp, and in addition provides a barricade light which is much more effective and reliable than previously available flashing signal lights.

What is claimed as my invention is:

1. Apparatus for producing light flashes, comprising: a gaseous discharge tube; a transformer having a primary and a secondary; means connecting the terminals of the tube across the secondary of the transformer so that the tube lights up with each voltage surge in the secondary; a source of D.C. voltage; a pair of normally open contacts for connecting the primary with the voltage source; a pair of normally closed contacts connected in series-circuit with the normally open contacts so that both pairs of contacts must be closed to energize the primary and whereby abrupt opening of either pair of contacts results in a voltage surge in the secondary to light up the tube; means to cause the normally closed contacts to alternately open and close in quick succession whenever and as long as said normally open contacts are closed; and means activated by energization of the transformer to periodically close the normally open contacts.

2. In a flashing type barricade light, the combination of: a gaseous discharge tube; a transformer having a primary and a secondary; means connecting the discharge tube in series circuit with the secondary; a direct current voltage source; a pair of normally open contacts; a pair of normally closed contacts, one of which is carried by an arm capable of vibrating to effect rapid opening and closing of said normally closed contacts; means connecting said two pairs of contacts in series circuit with one another and with the primary and said voltage source so that both pairs of contacts must be closed to effect energization of the primary, and so that abrupt opening of either pair of contacts results in a tube-lighting voltage surge in the secondary; means for periodically closing said pair of normally open contacts and holding them closed momentarily; and electromagnetic means energized by the primary when the same is connected across the voltage source to cause said arm to vibrate and effect rapid opening and closing of said pair of normally closed contacts as long as the normally open contacts are closed, to thereby effect lighting of the tube for a longer interval than would result from only the closure and opening of said normally open contacts.

3. In a device for energizing a gas filled illuminating tube so as to light it in intermittent flashes, each having the appearance of substantial duration: a transformer having a primary and a secondary; means connecting the secondary with the gas filled tube; electromagnetic vibrator means including a pair of normally closed contacts one of which is carried by a resilient arm capable of vibrating to effect rapid opening and closing of said normally closed contacts, said contacts being connected in series with the primary and with a source of energizing current, whereby the primary may be pulsatingly energized from the current source to induce rapid pulsations of tube energizing current in the secondary; and means to effect periodically intermittent energization of said electromagnetic vibrator means for brief intervals, said last named means including switch means connected in series with said current source and with said electromagnetic vibrator means, and electromagnetically responsive means for actuating said switch means to close it intermittently.

4. A flashing barricade light comprising: a gas-filled illuminating tube; a source of D.C. voltage; a pair of normally closed contacts; a pair of normally open contacts; circuit means connecting the normally closed and the normally open contacts in series across the voltage source; means connected with said circuit and the terminals of the gas-filled tube and operable as a result of each successive closure and opening of said circuit means to energize the tube; means to cause said normally closed contacts to alternately open and close in quick succession whenever and as long as the normally open contacts are closed, to bring about rapidly recurring momentary energization of the lamp when and as long as the normally open contacts are closed, said last named means comprising a vibrator having one of the normally closed contacts mounted on its movable element, and electromagnetic means connected with said circuit means and operable upon energization thereof to actuate the vibrator; and means including a momentum wheel to effect periodic closure of said normally open contacts.

References Cited in the file of this patent

UNITED STATES PATENTS

| | | |
|---|---|---|
| 2,129,882 | Shattuck et al. | Sept. 13, 1938 |
| 2,292,775 | Shattuck | Aug. 11, 1942 |
| 2,365,587 | Pennow | Dec. 19, 1944 |
| 2,520,565 | Rivers | Aug. 29, 1950 |
| 2,810,841 | Berch | Oct. 22, 1957 |
| 2,838,693 | Van Horn | June 10, 1958 |